May 25, 1965

W. S. EASTMAN ETAL 3,185,619

APPARATUS FOR MOLDING PULP ARTICLES

Filed May 27, 1963

Watson S. Eastman
Eugene M. Alsman
INVENTORS

BY

Atty.

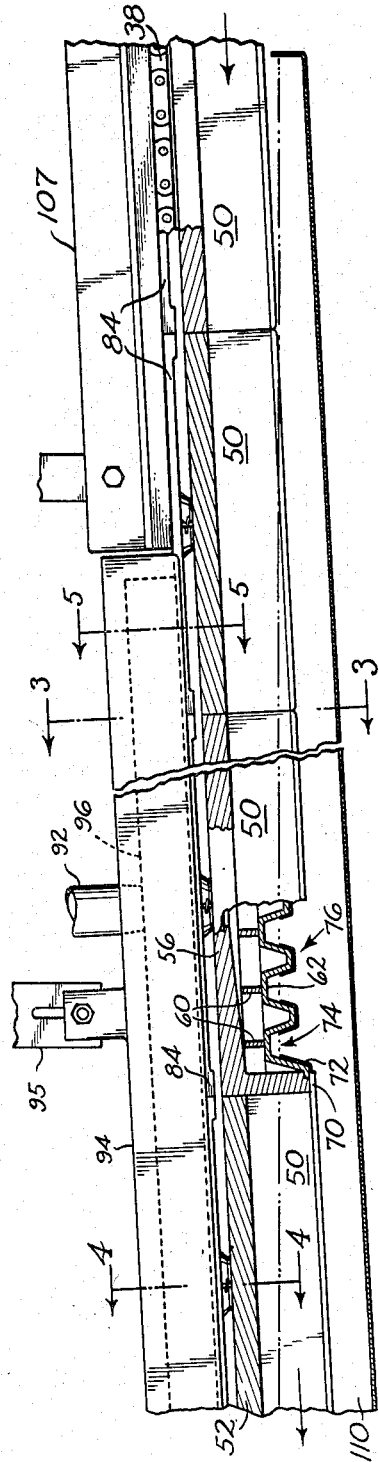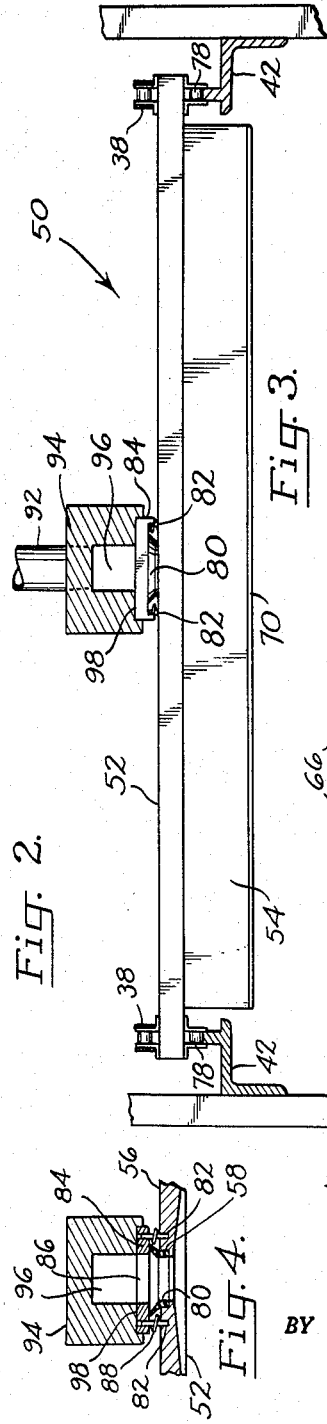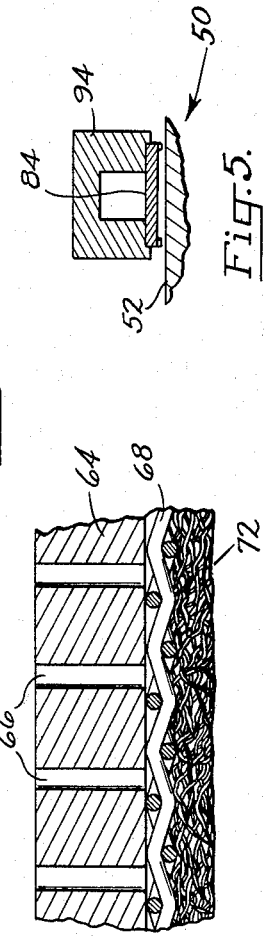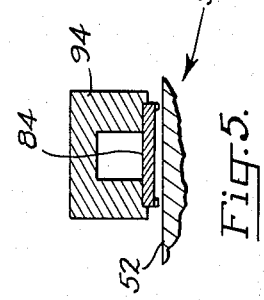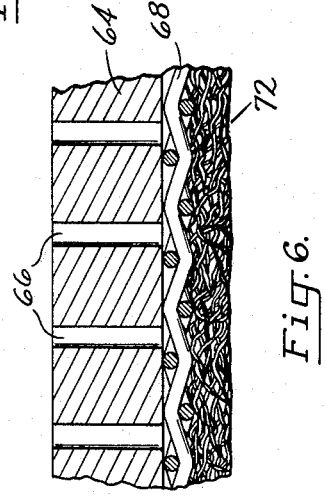
Watson S. Eastman
Eugene M. Alsman
INVENTORS May 25, 1965 W. S. EASTMAN ETAL 3,185,619
APPARATUS FOR MOLDING PULP ARTICLES
Filed May 27, 1963 3 Sheets-Sheet 3

Watson S. Eastman
Eugene M. Alsman
INVENTORS

BY *Eugene D. Farley*

Atty.

United States Patent Office 3,185,619
Patented May 25, 1965

3,185,619
APPARATUS FOR MOLDING PULP ARTICLES
Watson S. Eastman and Eugene M. Alsman, Portland,
Oreg., assignors to Molded Container Corporation, a
corporation of Oregon
Filed May 27, 1963, Ser. No. 283,632
10 Claims. (Cl. 162—392)

This invention relates to method and apparatus for the manufacture of molded pulp articles such as egg cartons, fruit trays, cartons, containers, small figures and like objects.

Heretofore two principal types of apparatus have been employed in the vacuum forming of molded pulp articles. In the first, a plurality of vacuum forming dies are mounted on a cylinder-type conveyor which, upon rotation, dips the dies into a selected pulp. In the second, a plurality of vacuum forming dies are mounted on a horizontally arranged, endless conveyor. On the upper stretch of the conveyor the dies are filled with pulp which then is sucked against the dies to produce the molded articles. In either case, the molded articles are stripped from the dies and transferred to drying units to dehydrate them and form the finished product.

Both of the foregoing classes of apparatus inherently encounter operational difficulties which have interfered with their successful application. Valving difficulties have prevented the successful transfer of the pulp to the dies. The freshly-molded, wet articles are extremely fragile and difficult to remove from the dies without breakage.

In addition, the wet, molded articles are difficult to dry in the short drying cycle demanded of a continuous, commercial operation. The hot transfer dies conventionally used to dry the wet articles scorch them, or case harden them so that it is extremely difficult to dry the central portion of the articles.

Perhaps the most serious difficulty of all, however, is the tendency of the dies to become plugged. This difficulty is materially increased by the fact that the pulp slurries employed often are made from waste paper and magazine stock which may be loaded with fillers, adhesives and pigments. These materials build up deposits in various locations on the dies, with the result that imperfectly molded pulp articles are formed. Moreover, because of their adhesive character, these deposits are quite difficult to remove.

It is the general object of the present invention to provide pulp molding method and apparatus which overcomes the foregoing disadvantages and which is applicable to the rapid, continuous commercial production of diverse molded pulp articles of predetermined and uniform properties.

The manner in which the foregoing and other objects of the invention are accomplished will be apparent from the accompanying specification and claims, considered together with the drawings, wherein:

FIG. 2 is an enlarged fragmentary view, partly in section, illustrating the die assemblies employed in the herein described pulp molding apparatus, their manner of mounting, and the manner in which they are passed through a pulp slurry;

Figure 8:
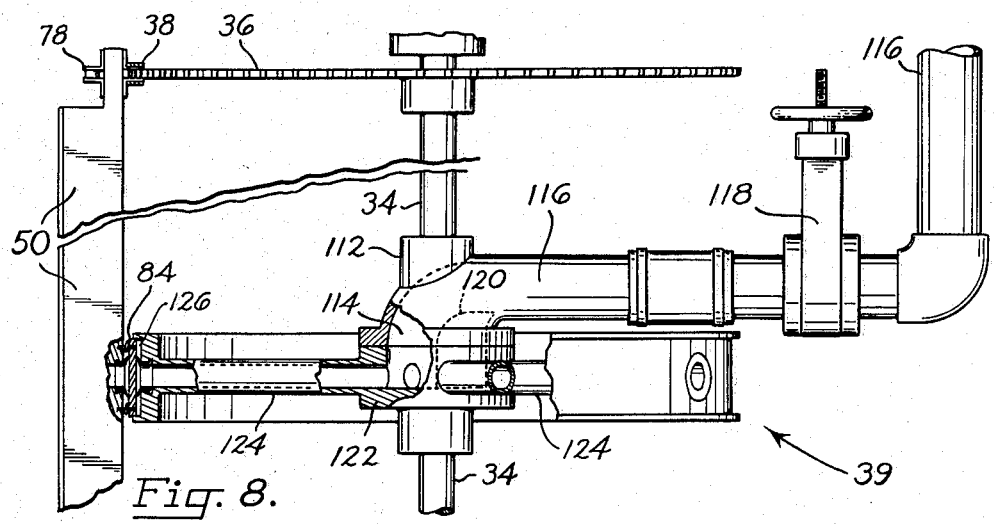
Figure 7:
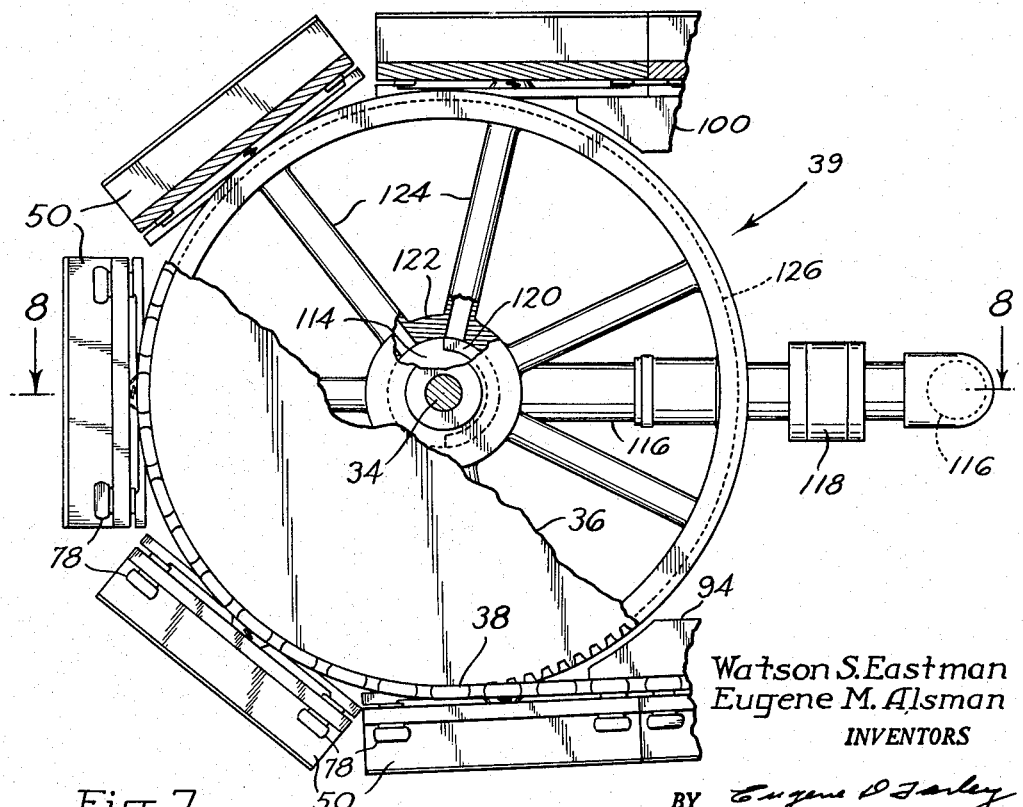

FIGS. 3, 4 and 5 are transverse sectional views taken along lines 3—3, 4—4, and 5—5, respectively, of FIG. 2;

FIG. 6 is an enlarged fragmentary detail view illustrating still further the construction of the die and the manner of building up a pulp article on it;

FIG. 7 is a view in side elevation, partly in section, and partly broken away, of a vacuum roll assembly included in the herein described pulp molding apparatus; and FIG. 8 is a plan view partly in section of the vacuum roll of FIG. 7.

Generally stated, the presently described pulp molding method comprises dipping a vacuum pulp molding die into a pulp slurry, and continuously moving the die through the slurry in substantially straight line motion, thereby building up on the die a pulp article of predetermined thickness. The die then is removed from the slurry after which vacuum may be applied to the article on the die for partly consolidating and dehydrating it.

Next, hot gas is passed through the article, still on the die, for further drying it and rendering it self sustaining. Thereafter the article is pressed against the die for compressing it and calendering its surface. The article then is removed from the die and further dried, if necessary, to attain the desired moisture content.

The presently described pulp molding apparatus broadly comprises means for accomplishing the foregoing operations, as will appear hereinafter.

Figure 1:
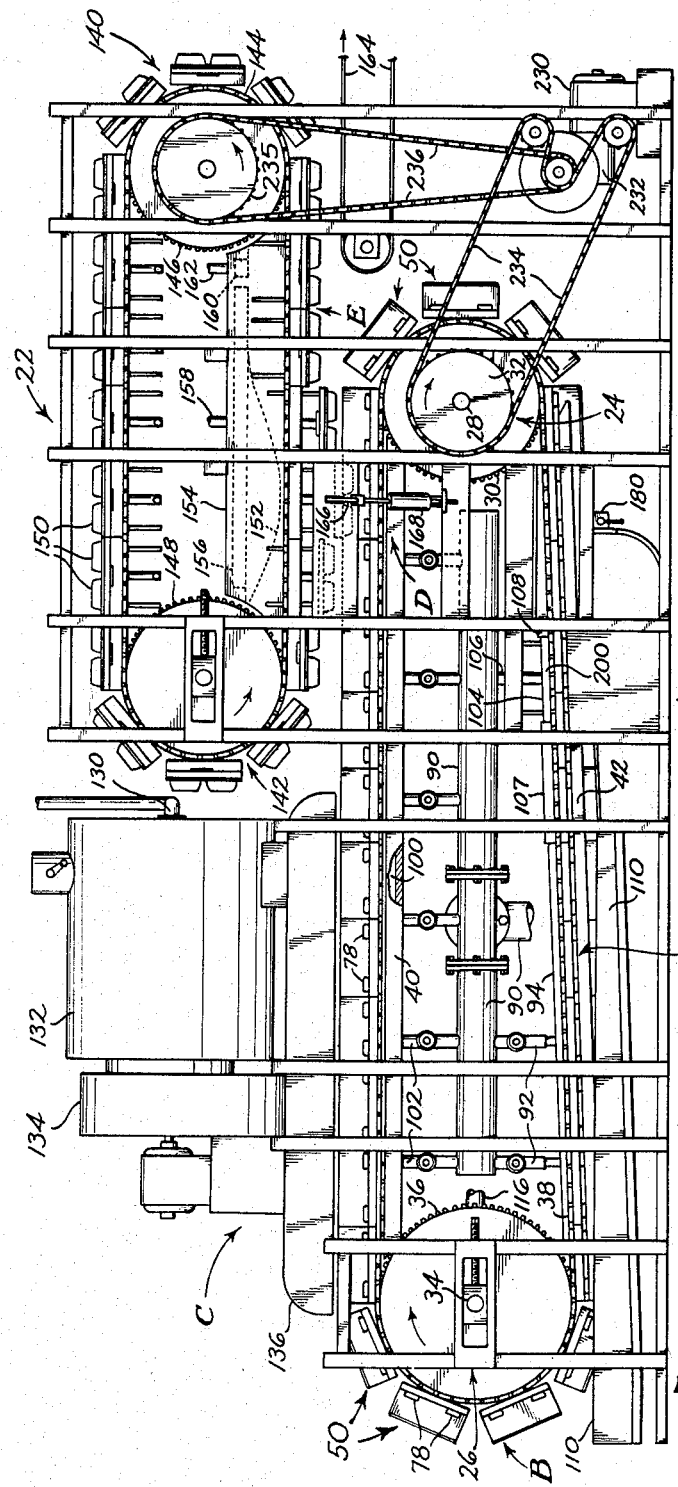
FIG. 1 is a view in side elevation of the herein described pulp molding apparatus.

Considering the foregoing further and with particular reference to the drawings:

In carrying out the method of the invention, vacuum forming dies are passed successively through a plurality of zones in which the various operations are carried out. As is apparent from FIG. 1, this is made possible through the employment of a pair of aligned partially overlapped endless conveyors indicated generally at 20, 22.

On lower conveyor 20, the vacuum forming dies first pass through an article-forming zone A in which the dies, in inverted position, are dipped into a pulp slurry for forming the article on the die surfaces.

Next the dies bearing the partly formed wet articles are passed through a dehydrating and consolidating zone B where part of the water is removed from the articles by suction.

In the next zone, the drying zone C, hot gases are passed through the articles on the dies for drying the articles so that they may be handled safely, or for drying them completely if this is desired.

Next, in the pressing zone D, the dried articles are pressed against the dies in which they are contained for consolidating the articles and calendering their surfaces. This is accomplished by the application of pressing and transfer dies mounted on the overlapping endless conveyor 22.

In the transfer zone E which follows, the pressed articles are removed from the forming dies and transferred, for example, to an offbearing conveyor.

Preliminary to being passed again through the article forming zone, the forming dies are passed through two cleaning stages. In the first, zone F, they are spot cleaned with steam, detergents, chemicals or other materials for the removal particularly of gummy deposits. In the second stage, carried out in zone G, the dies are subjected to a general washing designed to remove dirt and residual pulp.

The lower endless conveyor system 20, which carries the vacuum forming dies employed in the foregoing sequence, is supported between a drive roll assembly 24 and a vacuum roll assembly 26.

The drive roll assembly is mounted on a rotatable shaft 28 to which are affixed a pair of sprockets 30, an intermediate guide wheel not illustrated, and a drive sprocket 32.

The vacuum roll assembly is supported on a rotatable shaft 34 to which are affixed a pair of sprockets 36 and an intermediate vacuum wheel 39 to be described in detail later.

Sprockets 30, 36 mount a pair of drive chains 38 which by reason of their horizontal position provide upper and lower stretches between the two roller assemblies. The upper stretches of the chains are supported by horizontal tracks 40; the lower, by horizontal tracks 42.

The conveyor thus described supports a series of vacuum die assemblies arranged end to end in abutting relationship. The construction of these assemblies, and their manner of mounting on the conveyor, is evident particularly in FIGS. 2 and 3.

Each assembly is indicated generally at 50. It includes a die holder having a base 52, side walls 54 and a tapered bottom 56. The base is provided with a central vacuum aperture 58 and with a plurality of ribs 60.

The ribs support a die member 62 of appropriate construction and contour. Thus it may be fabricated from sintered metal, sintered glass, sintered plastic, or from perforated metal sheets overlaid with a screen.

In the special case illustrated in FIG. 6, the die member comprises a base 64 provided with numerous vacuum openings 66 and overlaid with a screen 68. The screen and base are maintained in position against the edges of walls 54 of the die holder by means of a retainer 70. When the die is immersed in a pulp slurry, and suction applied through opening 66, an article 72 of pulp builds up on the screen 68, in the contour of the die.

Although the die contour is widely variable, in the illustrated form of the invention, it assumes the shape of an egg carton having depressed areas 74 to receive the eggs and peaked areas 76 which act as dividers to separate the eggs.

To support the die holders as they travel, first on the lower stretch, and then on the upper stretch of the endless conveyor, there are provided a plurality of rollers 78 on the margins of the base plate 52, on the side opposite chains 38.

Coupling means are associated with each die assembly to make possible coupling the die to a source of vacuum, in sealed relation, over a substantial duration of linear travel.

Thus in vacuum aperture 58 of the base of the die holder (FIG. 4), there is seated a resilient sealing ring 80. A pair of connecting pins 82, diammetrically opposed, are pressed into the die holder bottom outside the sealing ring. A slide bar 84 having a vacuum aperture 86 receives the free ends of pins 82.

Resiliently compressive members such as springs 88, or lengths of rubber tubing, are mounted on pins 82, between die holder base 56 and slide plate 84.

Vacuum aperture 86 in the slide plate and vacuum aperture 58 in the die holder base are in substantial registration and afford means of connecting the die holder to the source of vacuum.

The vacuum source is a vacuum pump of substantial capacity provided with a water trap. The pump communicates with a vacuum conduit system including main line 90 and branch lines 92, each of which is controlled by its own valve.

Branch lines 92 in turn communicate with a vacuum bar or vacuum trough 94 adjustably supported from slotted hanger bars 95. Vacuum trough 94 is formed with a central, downwardly facing channel 96 and with a guideway 98 which borders the channel. This guideway is dimensioned to receive slide bar 84 of the die assembly in sliding, sealed relationship.

Similar vacuum bars are associated with other units of the conveyor assembly. Thus an elongated vacuum bar 100 is associated with the upper stretch of the conveyor. It is connected to vacuum conduit 90 by means of valved branch lines 102. It works in the drying and pressing zones of the assembly, as will appear hereinafter.

A third vacuum bar 104 is connected through feeder line 106 to vacuum conduit 90. It works in the washing zone G of the unit as also will appear hereinafter.

To bridge the gaps between the vacuum bars there are supplied rail segments 107 and 108 respectively which are traversed by slide plates 84 on the die holders during the intervals when the slide plates are not in the process of traversing one of the vacuum bars.

In this manner there is afforded a means for continuously applying vacuum to the dies as they progress linearly through the various zones. In article-forming zone A, vacuum is supplied through vacuum trough 94. In drying zone C, as well as in pressing zone E, it is supplied by vacuum trough 100. In washing zone G it is supplied by vacuum trough 104.

In article forming zone A, the dies are passed in end abutting relationship through a vat 110 having a sloping bottom and arranged to extend beyond the end of vacuum roll 26. As the dies in their inverted position enter the upstream end of the vat and progress along the length of it, they are immersed progressively deeper in the slurry contained in the vat, suction being applied all the while. The pulp articles thereupon are built up on the dies to a depth determined by such factors as the consistency of the slurry, the intensity of the vacuum, the size of the openings in the dies, etc.

It is a particular feature of the invention, however, that exposing the inverted dies to the slurry over a relatively prolonged period of linear travel enables better control of the vacuum and of the deposition of the pulp on the dies, resulting in the formation of pulp articles of uniform wall thickness, which are softer and more resilient and have more uniform wall thicknesses than do the articles manufactured by prior art machines relying upon cylinder and die filling principles.

After leaving vat 110, the dies pass to zone B, the dehydrating and consolidating zone. Here three important operations are performed.

First, the forming of the articles against the die surface is completed. Second, the articles are dehydrated by the vacuum removal of a substantial proportion of water, facilitating the subsequent drying operation and improving the strength of the articles. Third, the articles are held firmly against the die as they are transferred to the upper stretch of the conveyor, preventing injury to them.

These three functions are made possible by the inclusion in the assembly of a novel vacuum wheel 39, the construction of which is illustrated in FIGS. 7 and 8.

As mentioned before, this wheel is a component of vacuum roll assembly 26 which supports one end of the lower endless conveyor system. It is fixed to shaft 34 intermediate between sprockets 36. It includes a conduit 112, the interior of which is provided with a passageway 114 communicating with a vacuum line 116 through valve 118. The construction of the conduit is such that a semi-circular extension 120 projects into the hollow hub 122 of the vacuum wheel.

Hub 122 communicates with a plurality of hollow spokes 124. These are spaced by angular distances corresponding to the distances between the vacuum apertures and the die assemblies.

The hollow spokes open out into a peripheral channel 126 along the rim of the wheel. This channel corresponds in function and lateral dimension to guideway 98 in vacuum trough 94. It is designed to receive slide bar 84 with the die aperture registering with the opening through the spoke.

Accordingly, as the die assembly is passed around wheel 39, vacuum is applied continuously to each die, sucking water from the molded pulp article on the die face, and dehydrating it while contemporaneously completing its formation and holding it securely in place. The die assemblies then are passed to zone C in which the articles are dried.

In zone C the drying is effectuated by passing hot gas through the articles and through the dies, still making use of the evacuating system. To this end the assemblies are passed along vacuum trough 100, with slide plates 84 sliding in the groove of the trough, in the manner described in conjunction with vacuum trough 94.

A burner 130 heats a furnace 132, the resulting hot gases being passed by fan 134 into a hood-shaped oven 136 which is open at the bottom, with its side walls extending in close proximity to the side edges of the die holders. The die assemblies, which now have been rotated 180° from their inverted position in zone A, lie face up and accordingly the hot gases contained in the oven are sucked by the applied vacuum through the articles, through the dies and out through vacuum conduit 90.

By controlling the vacuum applied, the temperature of the gases, and the rate of travel through the heating zone, a very precise degree of drying of the pulp articles may be achieved. This may range, for example, from a rather cursory drying intended only to render the articles self-sustaining, to a drying so complete as to eliminate the necessity for a subsequent drying stage. The latter might be desirable in circumstances where a large article, not readily susceptible to rapid transfer and ordinary drying, is being manufactured.

The dried articles then are ready for the next stage of the operation which comprises pressing them and calendering their exposed surfaces in zone D. This procedure, in turn, is preliminary to removal of the articles from the dies and their transfer to an offbearing conveyor in zone E.

Both of these functions are carried out through the agency of endless conveyor unit 22 which as mentioned above, overlaps and is aligned with endless conveyor 20.

The construction of endless conveyor 22 is known and hence it is not illustrated in great detail. However, it comprises a drive roll assembly 140 and an idler roll assembly 142 mounting an endless conveyor which includes chains 144 engaging sprockets 146, 148 on the respective rolls.

Mounted on the rolls are a plurality of male transfer dies 150. These are complementary in contour to the female forming dies on the lower endless conveyor. They are mounted for actuation by a cam 152 between the raised, lowered and raised positions shown from left to right in FIG. 1.

As they traverse the lower stretch of conveyor 22, transfer dies 150 communicate with a vacuum trough 154 which is similar in design and function to vacuum troughs 94, 100 previously described. However, the length of the trough is discontinuous.

The length indicated at 156 is connected to a source of vacuum through conduit 158. On the other hand, the length indicated at 160 is connected through conduit 162 to a supply of air under pressure. In this manner the formed articles may be sucked up on the transfer dies in a first stage and, after a predetermined duration of linear travel, blown off the transfer dies onto an offbearing conveyor 164, suitably arranged to receive the articles.

Before this transfer is effectuated, however, the articles are pressed and calendered in zone D by making use of the surfaces of the transfer dies as the press platens and calendering surfaces.

This is made possible by supplementing the action of cam 152 with lever means 166 pivoted to a cylinder 168 and so arranged as to bear down on the margins of each die holder as it passes the cylinder. A substantial but controlled pressure thus is applied to the transfer dies as required to consolidate the articles in the forming dies and to render their surfaces smooth and uniform.

After pressing the articles in zone D and transferring them to zone E, the transfer dies, moving counterclockwise into the transfer area on endless conveyor 22 are recycled to the pressing and calendering of further molded and dried articles.

The forming dies on conveyor 20, relieved of their burdens of formed pulp articles, but traveling clockwise, pass through cleaning zones F and G.

In zone F they may be sprayed with steam by jet cleaning unit 180. They next may be subjected to a general washing in zone G by a water spray unit indicated generally at 200. They then are ready for another pass through vat 110 in which another layer of pulp is applied to the die surfaces.

Both the upper and lower conveyor assemblies may be driven synchronously from a common motor 230. Through a suitable gear reducing unit 232, this motor drives a first chain 234 connected to sprocket 32 of drive roll 24. Through a second chain 236 it drives at the same rate the drive sprocket 235 of the drive roll unit 140 of the upper endless conveyor assembly.

*Operation*

The operation of the herein described apparatus is as follows:

Vat 110 is filled with pulp slurry of the desired type and consistency. Die assemblies 50 are pased inverted into the pulp in zone A whereupon they pick up a coating of the predetermined thickness, forming the articles.

The dies leaving the vat pass to zone B wherein by the continued application of vacuum, the articles are dehydrated and consolidated. This is accomplished by passing the dies around a vacuum wheel 39 having hollow spokes connected to a source of vacuum and communicating with the dies.

Next the dies pass through zone C where they again are connected to the vacuum source which now serves the function of pulling hot gas from oven 136 through the articles and through the dies, thereby drying the articles to any predetermined degree without scorching them and without case hardening them, as was the case when the prior art heated transfer dies were employed to serve the drying function.

Next the dies are transferred to zone D wherein cylinders 168 apply pressure to transfer dies 150 mounted on an endless conveyor 22. This further compresses the articles and calenders their surfaces, making them smooth.

In zone E, release of suction applied to the forming dies on the lower conveyor assembly and concomitant application of vacuum to the transfer dies on the upper conveyor assembly results in passing the articles from the former to the latter. They then are blow off on conveyor 164.

The forming dies on the lower conveying unit, from which the articles have been removed, now pass through jet cleaning units 180 and washing units 200 in zones F and G, after which they are cycled to vat 110 for the deposit of a further quantity of pulp.

It is to be understood that the form of our invention herein shown and described is to be taken as a preferred example of the same and that various other changes in the shape, size and arrangement of parts may be resorted to without departing from the spirit of our invention or the scope of the subjoined claims.

Having thus described our invention, we claim:

1. Pulp molding apparatus comprising:
   (a) a plurality of vacuum forming dies,
   (b) endless conveyor means mounting the dies in spaced linear relation,
   (c) drive roll and vacuum roll means supporting the conveyor means and dividing it into upper and lower stretches,
   (d) receptacle means adapted to contain pulp slurry and positioned below the lower stretch for traversal by the dies, inverted and in linear travel,
   (e) evacuating means communicating with the inverted dies as they traverse the receptacle means for forming pulp articles thereon,
   (f) the vacuum roll means being positioned downstream from the receptacle means for reception of the dies and the wet pulp articles thereon, (g) evacuating means connected to the dies as they traverse the vacuum roll means for dehydrating the articles,
(h) oven means positioned above the upper stretch for traversal by the dies, in upright position and linear travel,
(i) evacuating means connected to the dies as they traverse the oven means for drying the articles by pulling hot gas through them, and
(j) transfer means operative to remove the dried articles from the dies.

2. Pulp molding apparatus comprising:
(a) a plurality of vacuum forming dies,
(b) endless conveyor means mounting the dies in spaced linear relation,
(c) drive roll and vacuum roll means supporting the conveyor means and dividing it into upper and lower stretches,
(d) receptacle means adapted to contain pulp slurry and positioned below the lower stretch for traversal by the dies, inverted and in linear travel,
(e) evacuating means communicating with the inverted dies as they traverse the receptacle means for forming pulp articles thereon,
(f) the vacuum roll means being positioned downstream from the receptacle means for reception of the dies and the wet pulp articles thereon,
(g) evacuating means connected to the dies as they traverse the vacuum roll means for dehydrating the article,
(h) oven means positioned above the upper stretch for traversal by the dies, in upright position and linear travel,
(i) evacuating means connected to the dies as they traverse the oven means for drying the articles by pulling hot gas through them,
(j) press means positioned for pressing the dried articles against the dies in which they are contained, and
(k) transfer means operative to remove the dried articles from the dies.

3. The apparatus of claim 2 wherein each evacuating means comprises a vacuum trough provided with a longitudinal guideway communicating with the trough, and wherein each die includes
(a) a slide plate dimensioned for reception in the guideway,
(b) a vacuum aperture in the plate communicating with the die and trough,
(c) pin means attaching the plate to the die, and
(d) resilient means interposed between the plate and the die for pressing the plate against the guideway in sealing engagement.

4. The apparatus of claim 2 wherein each evacuating means comprises a vacuum trough provided with a longitudinal guideway communicating with the trough, and wherein each die includes
(a) a slide plate dimensioned for reception in the guideway,
(b) a vacuum aperture in the plate communicating with the die and trough,
(c) pin means attaching the plate to the die, and
(d) resiliently compressive members mounted on the pins between the plate and dies for pressing the plate against the guideway in sealing engagement.

5. The apparatus of claim 2 wherein each evacuating means comprises a vacuum trough provided with a longitudinal guideway communicating with the trough, and wherein each die includes
(a) a slide plate dimensioned for reception in the guideway,
(b) a vacuum aperture in the plate communicating with the die and trough,
(c) pin means attaching the plate to the die,
(d) seal rings seated in the die and sealing the apertures in the plates, and
(e) resilient means interposed between the plate and the die for pressing the plate against the guideway in sealing engagement.

6. In pulp molding apparatus
(a) a vacuum trough,
(b) a plurality of die holders each having a vacuum aperture,
(c) conveyor means mounting the die holders with the apertures therein adjacent and aligned with the vacuum trough,
(d) a plurality of slide plates having vacuum apertures and adapted to slide across the open face of the vacuum trough,
(e) means connecting one plate to each die with the vacuum apertures in each in communicating relation, and
(f) resilient means interposed between the plate and the die for pressing the plate against the vacuum trough in sealing engagement.

7. In pulp molding apparatus
(a) a vacuum trough,
(b) a plurality of die holders each having a vacuum aperture,
(c) conveyor means mounting the die holders with the apertures therein adjacent and aligned with the vacuum trough,
(d) a plurality of slide plates having vacuum apertures and adapted to slide across the open face of the vacuum trough,
(e) pin means connecting one plate to each die with the vacuum apertures communicating with each other,
(f) sealing rings seated in the vacuum apertures of the die and sealing the vacuum apertures of the plate, and
(g) resiliently compressive members mounted on the pins and interposed between the plates and the dies for pressing the plates against the vacuum trough in sealing engagement.

8. Pulp molding apparatus comprising:
(a) a plurality of vacuum forming dies,
(b) endless conveyor means mounting the dies in spaced linear relation,
(c) drive roll and vacuum roll means supporting the conveyor means and dividing it into upper and lower stretches,
(d) receptacle means adapted to contain pulp slurry and positioned below the lower stretch for transversal by the dies in linear travel,
(e) evacuating means communicating with the inverted dies as they traverse the receptacle means, forming pulp articles thereon,
(f) the vacuum roll means being positioned downstream from the receptacle means and including a wheel having a hollow hub with communicating hollow spokes and a peripheral vacuum trough in releasable sealing engagement with the dies as they traverse the wheel,
(g) evacuating means connected to the hub of the vacuum roll means for dehydrating the wet articles on the dies,
(h) oven means containing hot gas positioned above the upper stretch for traversal by the dies in linear travel,
(i) evacuating means connected to the dies as they traverse the oven means for drying the articles by pulling hot gas through them, and
(j) transfer means operative to remove the dried articles from the dies.

9. In pulp molding apparatus
(a) vacuum roll means supporting conveyor means mounting dies each having a vacuum aperture,
(b) the vacuum roll means having an evacuated hollow hub with communicating hollow spokes and peripheral vacuum trough,
(c) each die including a plate dimensioned for placement across the vacuum trough in sealing engagement,
(d) a vacuum aperture in the plate communicating with the die and trough,
(e) means attaching the plate to the die, and
(f) resilient means interposed between the plate and the die for pressing the plate against the vacuum trough in sealing engagement.

10. In pulp molding apparatus
(a) vacuum roll means supporting conveyor means mounting dies each having a vacuum aperture,
(b) the vacuum roll means having an evacuated hollow hub with communicating hollow spokes and peripheral vacuum trough,
(c) each die including a plate dimensioned for placement across the vacuum trough,
(d) a vacuum aperture in the plate communicating with the die and trough,
(e) pin means attaching the plate to the die,
(f) seal rings seated in the die and sealing the apertures in the plate, and
(g) resiliently compressive members mounted on the pins for pressing the plate against the trough in sealing engagement.

References Cited by the Examiner
UNITED STATES PATENTS

| | | | |
|---|---|---|---|
| 1,494,345 | 5/24 | Eaid | 162—395 |
| 1,497,915 | 6/24 | Kelleher et al. | 162—388 |
| 1,719,819 | 7/29 | Koppelman | 162—389 |
| 2,101,921 | 12/37 | Shaver | 162—226 |
| 2,592,518 | 4/52 | Magnani | 162—367 |
| 2,677,467 | 5/54 | Giorgini | 162—388 |
| 2,704,493 | 3/55 | Randall | 162—224 |

FOREIGN PATENTS 69,569   6/49   Denmark.

DONALL H. SYLVESTER, *Primary Examiner.*
MORRIS O. WOLK, *Examiner.*